United States Patent
Gao et al.

(10) Patent No.: US 7,974,343 B2
(45) Date of Patent: Jul. 5, 2011

(54) ENTROPY CODING METHOD FOR CODING VIDEO PREDICTION RESIDUAL COEFFICIENTS

(75) Inventors: Wen Gao, Beijing (CN); Debin Zhao, Beijing (CN); Qiang Wang, Beijing (CN); Siwei Ma, Beijing (CN); Yan Lu, Beijing (CN)

(73) Assignee: Institute of Computing Technology Chinese Academy of Science, Beijing (CN)

( * ) Notice: Subject to any disclaimer, the term of this patent is extended or adjusted under 35 U.S.C. 154(b) by 1269 days.

(21) Appl. No.: 10/572,440

(22) PCT Filed: Jul. 5, 2004

(86) PCT No.: PCT/CN2004/000750
§ 371 (c)(1),
(2), (4) Date: Nov. 13, 2006

(87) PCT Pub. No.: WO2005/027521
PCT Pub. Date: Mar. 24, 2005

(65) Prior Publication Data
US 2007/0200737 A1    Aug. 30, 2007

(30) Foreign Application Priority Data

Sep. 18, 2003 (CN) .................. 03 1 57189

(51) Int. Cl.
*H04N 7/12*  (2006.01)
*H04N 11/02* (2006.01)
*H04N 11/04* (2006.01)
*H04N 13/02* (2006.01)
*H04N 13/04* (2006.01)

(52) U.S. Cl. ............. 375/240.12; 375/240.23; 348/50; 348/51; 348/65; 348/67

(58) Field of Classification Search ............ 375/240.12, 375/240.23; 341/50, 51, 65, 67
See application file for complete search history.

(56) References Cited

U.S. PATENT DOCUMENTS

| | | | | |
|---|---|---|---|---|
| 5,552,832 A | * | 9/1996 | Astle ................. | 375/240.24 |
| 5,852,469 A | * | 12/1998 | Nagai et al. .......... | 375/240.23 |
| 7,095,896 B2 | * | 8/2006 | Abe et al. ............ | 382/233 |
| 2003/0185305 A1 | * | 10/2003 | MacInnis et al. ..... | 375/240.25 |
| 2004/0228540 A1 | * | 11/2004 | Chen et al. .......... | 382/246 |
| 2005/0226513 A1 | * | 10/2005 | Wallace et al. ....... | 382/232 |

* cited by examiner

*Primary Examiner* — Christopher S Kelley
*Assistant Examiner* — Chikaodili Anyikire
(74) *Attorney, Agent, or Firm* — J.C. Patents

(57) ABSTRACT

The present invention provides an entropy coding method for coding video prediction residual coefficients, comprising the steps of: firstly, zig-zag scanning coefficients of blocks to be coded to form a sequence of (level, run) pairs; secondly, selecting a type of code table for coding a current image block to be coded according to a type of macro block; then switching and coding each (level, run) pair in the obtained sequence of (level, run) pairs with multiple tables, with the reverse zig-zag scanning order for the coding order of the pairs; at last, coding a flag of End of Block EOB with the current code table. The present invention of an entropy coding method for coding video prediction residual coefficients fully considers the context information and the rules of symbol's conditional probability distribution by designing different tables for different block types and different regions of level. The coding efficiency is improved and no impact to computational implementation complexity is involved.

8 Claims, 2 Drawing Sheets

ENTROPY CODING METHOD FOR CODING VIDEO PREDICTION RESIDUAL COEFFICIENTS

FIELD OF THE INVENTION

The present invention relates to the image/video coding and decoding technique, and more particularly, to an entropy coding technique method applied in image/video compression and digital audio and video coding for improving coding efficiency and meanwhile keeping low software and hardware computational implementation complexity, which is in the technical field of digital media processing.

BACKGROUND OF THE INVENTION

Video coding technique is one of the key techniques in digital media storage and transmission and other applications. The core technique in video coding system consists of prediction coding, transform coding and entropy coding. Entropy coding indicates to encode the syntax elements produced in the process of coding (such as motion vector, block identification, block-based prediction residual, etc.) by exploiting information entropy, which has the function of eliminating the statistical redundancy of data.

In the previous video coding standards, the methods for coding the block-based prediction residual include: 2D-VLC (Variable Length Coding) entropy encoder in H.261 and MPEG (Motion Picture Experts Group)-2 standards, 3D-VLC entropy encoder in H.263 and MPEG-4 standards, CAVLC (Context-based Adaptive Variable Length Coding) entropy encoder in H.264/AVC (H.264 Video Coding Suggestion by International Telecommunications Union ITU-T or the ISO/IEC international standard 14496-10, i.e. MPEG-4, part 10 of the standard) and CABAC (Context-based Adaptive Binary Arithmetic Coding) entropy encoder.

2D-VLC entropy encoder employs the (level, run)+EOB coding manner for coding the residual coefficient, wherein level indicates the non-zero coefficient of the residual image block after Discrete Cosine Transformed (DCT) and quantization, run indicates the number of coefficients with the value of 0, ranging from the coefficient "level" to the first non-zero coefficient, and EOB (End of Block) means the Endof Block, which solely occupies one position in the code table, that is to say, to assign EOB one codeword individually. EOB is combined with a sequence of (level, run) pair by 3D-VLC entropy encoder to form a three dimensional variable (level, run, last), in which last indicates whether the current coefficient is the last one in this block so that the relative short codeword previously occupied by EOB in the code table is free, and the joint probability for level, run and EOB is exploited, hence the coding efficiency is improved. Because CAVLC entropy encoder in H.264/AVC Video Coding Standard fully utilizes the context information, and optimizes the size of 4×4 block, nice coding performance is obtained although level and run are encoded separately. All the above mentioned entropy encoders are variable length encoders with the basic principle of Huffman coding, that is to say, coding the symbols with large probability by short code words, and coding the symbols which appear with small probability by long code words in order to achieve the final purpose that the average code length is the shortest. CABAC entropy encoder in H.264/AVC Video Coding Standard is the arithmetic encoder. The arithmetic encoder has better capability than the variable length encoder. And because CABAC can realize fine modeling of the context, the probability of appearing the source symbols can be estimated more accurately, so that the coding efficiency is very high. But comparing with the variable length encoder, the arithmetic encoder has higher computational complexity as well as more complicated hardware implementation, in other words, the improvement of coding efficiency is exchanged by higher complexity of the software and hardware.

In consideration of the two aspects of the coding efficiency and the software and hardware implementation complexity, variable length coding is an entropy coding solution with a higher cost-performance ratio. In the variable length encoder, 2D-VLC entropy encoder exploits the joint probability of level and run, theoretically, the efficiency is higher than the manner of separately coding level and run by CAVLC entropy encoder. And comparing with 3D-VLC encoder, the code table of 2D-VLC is smaller in size. Therefore, 2D-VLC entropy encoder considers both the coding efficiency and the hardware implementation complexity. But the traditional 2D-VLC entropy encoder is coding by obtaining a single code table through global statistic, it has the defect that the single code table can not adapt well to the variation of local probability distributions so that the coding efficiency is lower.

SUMMARY OF THE INVENTION

The present invention provides an entropy coding method for coding video prediction residual coefficients in order to further improve coding efficiency as well as keep a low computational implementation complexity.

The objective of the present invention is realized as follows:

An entropy coding method for coding video prediction residual coefficients comprises the steps of:

step 1: zig-zag scanning an coefficient of an image block to be coded to form a sequence of (level, run) pair;

step 2: selecting a type of code table for coding a current image block to be coded according to a type of macro block that the image block exists in;

step 3: coding each (level, run) pair in the sequence of (level, run) pair obtained in step 1;

step 4: coding a flag of End of BlockEOB.

The present invention of an entropy coding method for coding video prediction residual coefficients introduces adaptive mechanism into 2D-VLC encoder, where optimal code tables are designed based on local statistical distributions for different macroblock types and different level regions, and in coding process the table that best matches the current local probability characteristics is selected by table switch. It fully considers the context information of the coefficients of the prediction residual block and the statistical rules. Further coding efficiency is improved and no impact to computational implementation complexity is involved.

DETAILED DESCRIPTION OF THE PREFERRED EMBODIMENTS

Now, the present invention will be described in details with reference to the accompanying drawings and the preferred embodiments.

Figure 1:
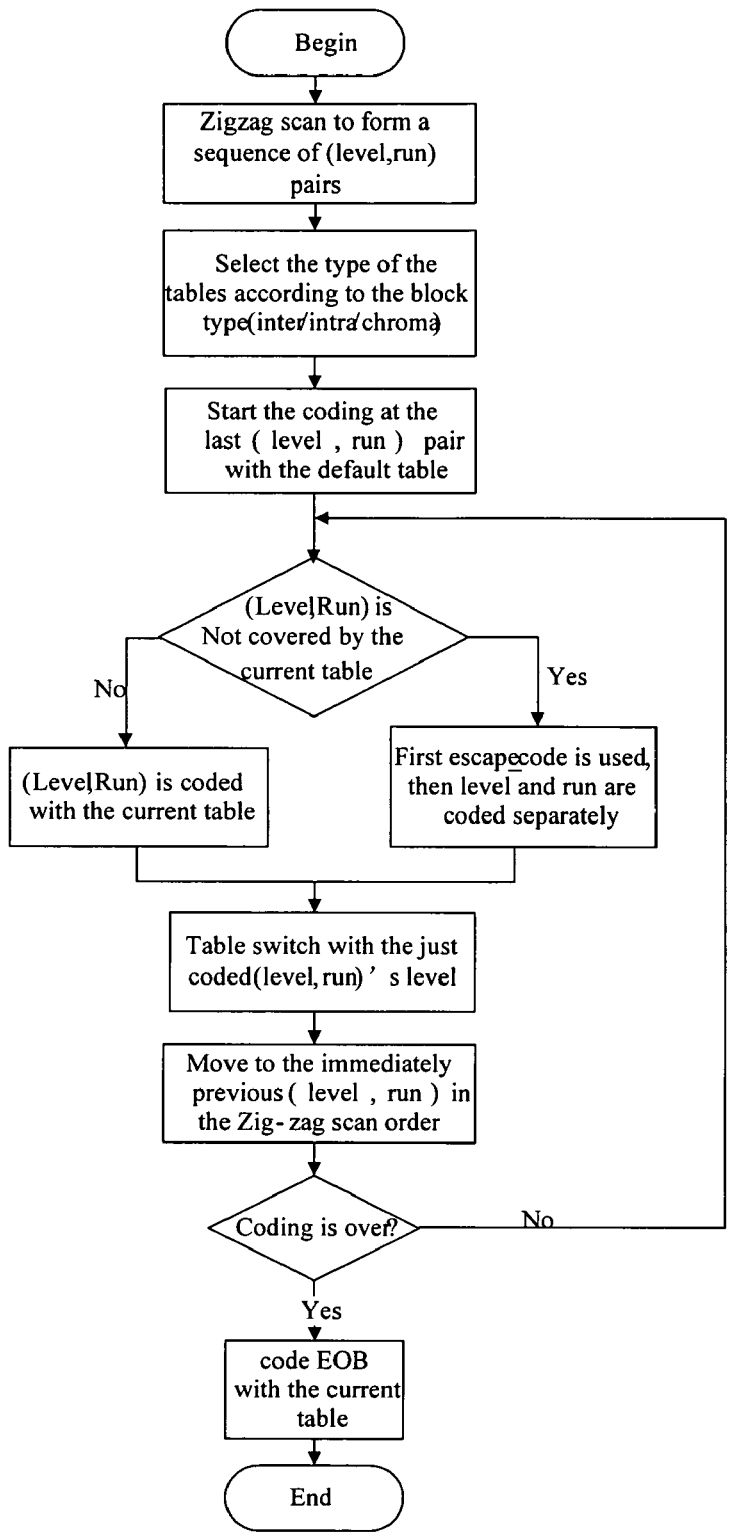
FIG. 1 is a flow chart of one embodiment in the present invention.
Figure 3:
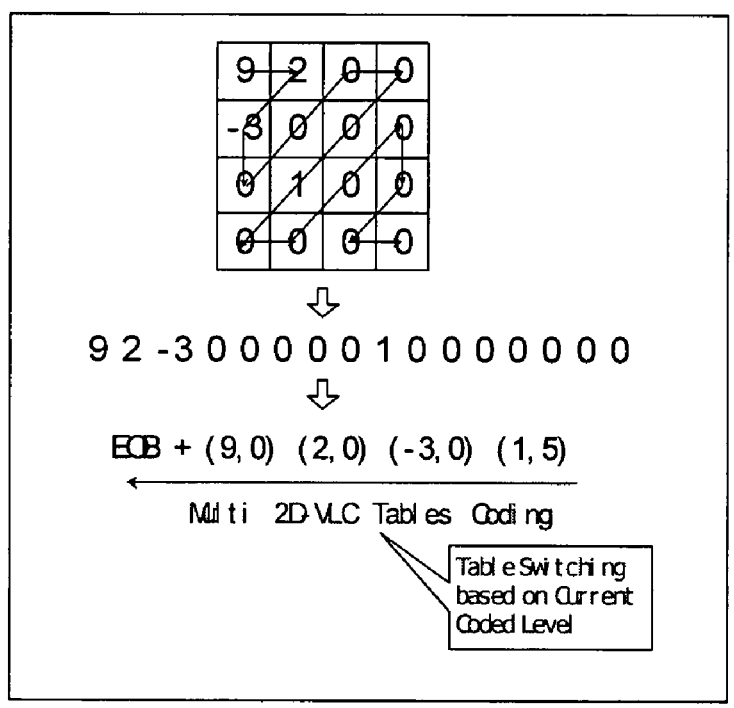
FIG. 3 is a diagrammatic sketch of the coding solution for 4×4 image block in the present invention.

As shown in FIG. 1 and FIG. 3, the entropy coding method described in the embodiment comprises the following steps:

step 1: zig-zag scanning an coefficient of an image block to be coded to form a sequence of (level, run) pair;

step 2: selecting a type of code table for coding a current image block to be coded according to a type of macro block that the image block exists in;

step 3: coding each (level, run) pair in the sequence of (level, run) pair obtained in step 1;

step 4: coding a flag of End of BlockEOB.

In image/video coding, macro block is the basic coding unit. Each macro block contains four 8×8 luminance blocks and two 8×8 chroma blocks, totally six blocks. For entropy coding the prediction residuals, each point in block is a coefficient, and this coefficient indicates the prediction residuals produced from the other coding steps occurred before the entropy coding. The macro block can be divided into two types, one is intra (internal) type, coding the image blocks to be encoded by using intra prediction method with the intra adjacent image blocks; the other is inter (external) type, coding the image blocks to be encoded by using inter prediction method with the image blocks of the adjacent frames. The two different prediction coding methods result in different characteristics of the obtained block residual coefficients, and different probability of appearing the same (level, run) pair formed after scanning. For example, one (level, run) pair is (3, 0), the probability to appear in all Intra type image blocks is 10%, but only 7% in all Inter type image blocks.

In order to improve the coding efficiency, the present invention designs different code tables for different types so that the length of code word of the encoded symbol can better match with the appearance probability of the encoded symbol in each type to obtain better coding efficiency.

Figure 2:
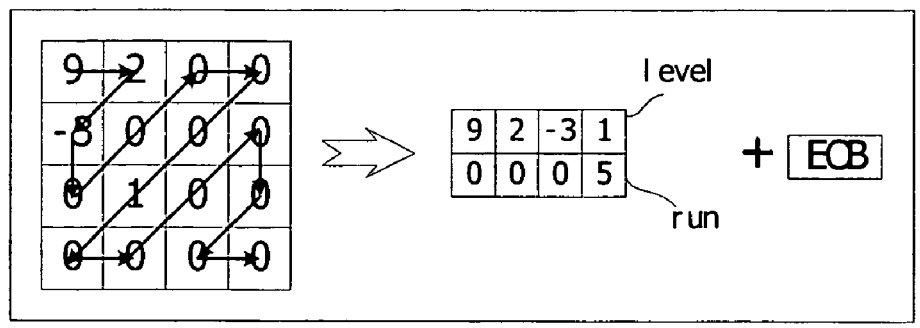
FIG. 2 is a diagrammatic sketch showing zig-zag scanning 4×4 image block to form a (level, run) pair in one embodiment of the present invention.

The zig-zag scanning of step 1, as shown in FIG. 2 and FIG. 3, begins from the left-up corner to the right-down corner of the block to be encoded, and obtains (level, run) pairs in turns.

The selecting a code table for coding coefficients in a current block to be coded according to a type of the image block of step 2, includes: if the type of the current macro block is Intra type, then selecting an Intra type code table to encode coefficients of a luminance part of the current macro block; if the type of the current macro block is Inter type, selecting an Inter type code table to encode coefficients of a luminance part of the current macro block; if for coding a chroma part of the current macro block, adopting an Inter type code table or an own code table of the chroma part itself. The effect of using an Inter type code table to encode a luminance part can basically satisfy the requirement of coding, and certainly can establish own code table for the chroma part itself basing on statistical analysis.

Step 3 of the embodiment further comprises:

step 31: coding a last (level, run) pair by using a default code table;

step 32: selecting a code table for coding a (level, run) pair positioned before the just coded (level, run) pair according to a level value of the just coded (level, run) pair;

step 33: coding the (level, run) pair positioned before the just coded (level, run) pair by using the code table selected by step 32;

step 34: proceeding to step 32 if not completely coding all (level, run) pairs; else ending step 3.

For entropy coding video, the smaller the coding result and the computational complexity are, the higher the coding efficiency is. And the present invention does not relate to computational complexity, and assign code words with smaller numbers for (level, run) pairs appearing with high probability the result after encoding the codeword is smaller so the final encoded result is the smallest with the highest efficiency For certain intra/Inter type image block, the present invention employs multiple different code tables to assign the code words. Each code table is designed after calculating the probability of appearing the next (level, run) pair to be encoded according to the level value of its own code table. Assign the code words from the smallest to the biggest in accordance with the probability of appearing the next (level, run) pair to be encoded from the highest to the lowest. It fully utilizes the environment of the context and the statistical discipline, which has improved more efficiency than the coding method having only one unified code table, only considering the general statistical discipline rather than considering the environment of the context. That is also the reason why step 32 switches code table in the method of the present invention.

Since the prediction results of the adjacent level values might be very close, in order to increase coding speed and decrease the storing demand of the code table, the present invention employs the method of separating sections to design multiple code tables, i.e., divides the whole into several regions; each region uses the same code table. Generally, the larger the level value is, the closer the prediction result is. In this case, most code tables are concentrated into the part with small level values.

A detailed embodiment of switching multiple code tables expressed by C programming language is provided at follows:

```
int incVlc[ ]={1,2,3,5,8,3000};
TableNum=0; //use VLC0_Intra or VLC0_Inter to encode the first(level,run)
For (icoeff=TotalCoeff; icoeff>0; icoeff—)//encode all none zero coefficients in the block
{
  encode_levelrun(TableNum); //use the current codetable, encode the current (level,run)
  if (abs (level)>incVlc[TableNum])//switch the code table by the encoded level value
  {
    if(abs(level)<=3)
      TableNum=(abs(level)–1);
    else if(abs(level)<=5)
      TableNum=3;
    else if(abs(level)<=8)
      TableNum=4;
    else
      TableNum=5;
  }
}
```

In the above method of selecting the code table, there are a total of 6 code tables for coding Inter type coefficient blocks, The possible value of the entire level is divided into 6 regions, 1, 2, 3, 4-5, 5-8 and above 8 corresponds to different code tables respectively.

The said code table is 2D-VLC structure, containing mapping relationship between (level, run) pairs, EOB and their codeword. Table 1 provides the examples of the utilized code tables for assigning the code words VLC0_Inter and VLC1_Inter, for coding Inter type image block. VLC0_Inter indicates a code table of Inter type image block that the level is 1, for coding the (level, run) pairs positioned after the (level, run) pair in which level is 1, or coding the first (level, run) pair as the default code table. VLC1_Inter indicates the code table of Inter type image block that level is 2, for coding the (level, run) pairs positioned after the (level, run) pair in which level is 2.

TABLE 1

VLC0_Inter

| Run | EOB | Level > 0 | | | | |
|---|---|---|---|---|---|---|
| | | 1 | 2 | 3 | 4 | 5 |
| 0 | — | 1 | 9 | 27 | 41 | 53 |
| 1 | — | 3 | 25 | — | — | — |
| 2 | — | 5 | 35 | — | — | — |
| 3 | — | 7 | 39 | — | — | — |
| 4 | — | 11 | 45 | — | — | — |
| 5 | — | 13 | 47 | — | — | — |
| 6 | — | 15 | 55 | — | — | — |
| 7 | — | 17 | — | — | — | — |
| 8 | — | 19 | — | — | — | — |
| 9 | — | 21 | — | — | — | — |
| 10 | — | 23 | — | — | — | — |
| 11 | — | 29 | — | — | — | — |
| 12 | — | 31 | — | — | — | — |
| 13 | — | 33 | — | — | — | — |
| 14 | — | 37 | — | — | — | — |
| 15 | — | 43 | — | — | — | — |
| 16 | — | 49 | — | — | — | — |
| 17 | — | 51 | — | — | — | — |
| 18 | — | 57 | — | — | — | — |

VLC1_Inter

| Run | EOB | Level > 0 | | | | | |
|---|---|---|---|---|---|---|---|
| | | 1 | 2 | 3 | 4 | 5 | 6 |
| 0 | 0 | 1 | 5 | 11 | 19 | 35 | 45 |
| 1 | — | 3 | 13 | 27 | 51 | — | — |
| 2 | — | 5 | 23 | 47 | — | — | — |
| 3 | — | 7 | 29 | 53 | — | — | — |
| 4 | — | 9 | 39 | — | — | — | — |
| 5 | — | 15 | 41 | — | — | — | — |
| 6 | — | 17 | 57 | — | — | — | — |
| 7 | — | 21 | — | — | — | — | — |
| 8 | — | 25 | — | — | — | — | — |
| 9 | — | 31 | — | — | — | — | — |
| 10 | — | 33 | — | — | — | — | — |
| 11 | — | 37 | — | — | — | — | — |
| 12 | — | 43 | — | — | — | — | — |
| 13 | — | 49 | — | — | — | — | — |
| 14 | — | 55 | — | — | — | — | — |
| 15 | — | — | — | — | — | — | — |
| 16 | — | — | — | — | — | — | — |
| 17 | — | — | — | — | — | — | — |
| 18 | — | — | — | — | — | — | — |

In said step 31, the default code table is VLC0_inter 或VLC0_intra. This is because in most cases there is a very large probability for that level is 1 in the last (level, run). Therefore, the best coding result can be gained under the circumstance without any context. That is also the reason why step 3 uses the method of reverse order to encode (level, run) from the backward to the forward.

Coding (level, run) number in the present invention comprises the following steps:

step 331: if (level, run) to be coded is covered in the code table, then obtaining the code word directly from the code table, and then converting the code word into Exp-Golomb code;

step 332: if (level, run) to be coded is not covered in the code table, first coding an escape_code, and then converting level and run into an Exp-Golomb code respectively.

Since the results of the statistical prediction usually are concentrated in one region, which is determined by the gradual variation of the image, those (level, run) pairs appearing with extremely small probability and out of the given region are not covered in the code table when designing the code table. It can be seen from code tables VLC0_Inter and VLC1_Inter that the prediction regions for the next level values are very concentrated in the code tables, so that the (level, run) pairs not covered in the code tables should be made an exceptional processing.

The approach of making an exceptional processing is: first, deciding a rank of Exp-Golomb code employed by the code table according to the current code table, in which the (level, run) pairs are not covered, second, coding an escape_code, and then converting level and run not covered in the code table into Exp-Golomb codes.

So called escape_code is an Exp-Golomb code, the code word corresponding to said Exp-Golomb code is bigger than all the code words in the corresponding code table.

So called Exp-Golomb code is Exponential-Golomb code. Exp-Golomb codes have different ranks, so suitable ranks should be selected for converting the code word of each code table into Exp-Golomb code; suitable ranks should be also selected for converting the level and run of (level, run) pairs not covered in the code table into Exp-Golomb codes The method of selecting ranks for all the data to be converted into Exp-Golomb codes is described as follows:

step 100: determining a type of the conversion if the codeword is coming from the (level, run) or EOB covered by the code table, then proceeding to step 101; if the level value or run value not covered by that of the code table, then proceeding to step 102;

step 101: deciding the rank of the Exp_Golomb code according to different code tables;

step 102: deciding the rank of the Exp_Golomb code according to the type of the macro block that the image block exists in which is an Intra type or an Inter type.

An embodiment of the corresponding relationship between the code table and a rank of Exp-Golomb code and the corresponding relationship between the type of the macro block that the image block exists in and a rank of Exp-Golomb code The code tables VLC0_Inter and VLC1_Inter select Exp-Golomb codes of second-rank, other code tables select third-rank Exp-Golomb codes.

The level value of Intra type image block corresponds to the third-rank Exp-Golomb code; the run value also corresponds to the third-rank Exp-Golomb code; the level value of Inter type image block corresponds to the second-rank Exp-Golomb code; the run value corresponds to the third-rank Exp-Golomb code.

Selection of the rank is decided by the distribution of the specific appearance probability, with the purpose of trying to short the data length after being encoded.

In the present invention, converting the code words or numeral values into Exp-Golomb codes comprises the following procedures:

At first deciding a rank of the used Exp-Golomb code according to the code table, then looking up the corresponding Exp-Golomb code from an Exp-Golomb code table according to the rank and the code word, and completing the conversion.

Table 2 provides the Exp-Golomb codes of each rank adopted in the entropy coding method of the present invention. The Golomb code is made up of the prefix and the postfix, in which the prefix code is a bit string with several 0s and a 1 at the end, and the postfix code is an information bit, calculating by the following code word formula:

$$INFO = \Sigma_{i=0}^{N} x_i \cdot 2^i$$

wherein, INFO is a value of information.

Table 2 is a shortened form of Exp-Golomb code table, in which Xi is 0 or 1. The code word corresponding to the Exp-Golomb code can be known by calculating each Exp-Golomb code by the code word formula. For example, calculate the Exp-Golomb code 00111 according to the above formula: INFO=4, L=5, so L/2=2 (only integer is accepted) according to the above code word formula, then the code word is 7.

Table 2

| rank | Exp-Golomb code | Code Length | Code Word or Numeral Value |
|---|---|---|---|
| K = 0 | 1 | 1 | 0 |
| | 0 1× 0 | 3 | $2^{L/2} - 1 + $ INFO |
| | 0 0 1 × 1 × 0 | 5 | |
| | 0 0 0 1 × 2 × 1 × 0 | 7 | |
| | 0 0 0 0 1 × 3 × 2 × 1 × 0 | 9 | |
| | 0 0 0 0 0 1 × 4 × 3 × 2 × 1 × 0 | 11 | |
| | 0 0 0 0 0 0 × 5 × 4 × 3 × 2 × 1 × 0 | 12 | $2^{(L+1)/2} - 1 + $ INFO |
| K = 1 | 1 × 0 | 2 | $2^{(L+1)/2} - 2 + $ INFO |
| | 0 1 × 1 × 0 | 4 | |
| | 0 0 1 × 2 × 1 × 0 | 6 | |
| | 0 0 0 1 × 3 × 2 × 1 × 0 | 8 | |
| | 0 0 0 0 1 × 4 × 3 × 2 × 1 × 0 | 10 | |
| | 0 0 0 0 0 × 5 × 4 × 3 × 2 × 1 × 0 | 11 | |
| K = 2 | 1 × 1 × 0 | 3 | $2^{(L+2)/2} - 4 + $ INFO |
| | 0 1 × 2 × 1 × 0 | 5 | |
| | 0 0 1 × 3 × 2 × 1 × 0 | 7 | |
| | 0 0 0 1 × 4 × 3 × 2 × 1 × 0 | 9 | |
| | 0 0 0 0 × 5 × 4 × 3 × 2 × 1 × 0 | 10 | |
| K = 3 | 1 × 2 × 1 × 0 | 4 | $2^{(L+3)/2} - 8 + $ INFO |
| | 0 1 × 3 × 2 × 1 × 0 | 6 | |
| | 0 0 1 × 4 × 3 × 2 × 1 × 0 | 8 | |
| | 0 0 0 × 5 × 4 × 3 × 2 × 1 × 0 | 9 | |
| K = 4 | 1 × 3 × 2 × 1 × 0 | 5 | $2^{(L+4)/2} - 16 + $ INFO |
| | 0 1 × 4 × 3 × 2 × 1 × 0 | 7 | |
| | 0 0 × 5 × 4 × 3 × 2 × 1 × 0 | 8 | |

The step 4, coding a flag of End of Block EOB comprises the detailed procedures of: selecting a code table for coding the EOB according to the (level, run) pair produced when step 3 is over, i.e. the level value of the last coded (level, run) pair in step 3, looking up a corresponding EOB code word from the code table and converting EOB code word into an Exp_Golomb code adopting the method described in step 331.

It can be seen by the foregoing description that the method of the present invention improves 2D-VLC entropy encoder, and the computational complexity is not high, but the coding efficiency is greatly increased.

It will be understood that the above embodiments are used only to explain but not to limit the present invention. In despite of the detailed description of the present invention with referring to above preferred embodiments, it should be understood that various modifications, changes or equivalents can be made by those skilled in the art without departing from the spirit and scope of the present invention.

What is claimed is:

1. An entropy coding method for coding video prediction residual coefficients, comprising the steps of:
    step 1: zig-zag scanning coefficients of an image block to be coded to form a sequence of (level, run) pairs;
    step 2: selecting a type of code table for coding a current image block to be coded according to a type of macro block in which the image block exists, in which, the said code table is 2D-VLC structure, containing mapping relationship between (level, run) pairs, EOB and their codeword;
    step 3: coding each (level, run) pair in the sequence of (level, run) pairs obtained in step 1 according to the code table selected in step 2; if (level, run) to be coded is covered in the code table, then obtaining the code word directly from the code table, and then converting the code word into an Exp-Golomb code; if (level, run) to be coded is not covered in the code table, first coding an escape_code, and then converting "level" and "run" into an Exp-Golomb code respectively;
    step 4: coding a flag of End of Block EOB.

2. The entropy coding method for coding video prediction residual coefficients as claimed in claim 1, wherein said zig-zag scanning includes: beginning at the most left-up corner of the image block, first moving one unit in a horizontal direction, and then moving toward a left-down direction in order; whenever arriving at the left or down edge of the image block, moving one unit toward a down or right direction, and then moving toward right-up direction in order; whenever arriving at the upper or right edge of the image block, moving one unit toward the right or down direction, and then moving toward left-down direction in order, arriving at the most right-down corner by iteratively performing in such manner; and obtaining the sequence of (level, run) pair of the entire image block.

3. The entropy coding method for coding video prediction residual coefficients as claimed in claim 1, wherein said selecting the code table for coding coefficients in the current image block to be coded according to a type of the macro block includes: if the type of the current macro block is Intra type, then selecting an Intra type code table to encode coefficients of a luminance part of the current macro block; if the type of the current macro block is Inter type, selecting an Inter type code table to encode coefficients of a luminance part of the current macro block; if coding a chroma part of the current macro block, adopting an Inter type code table or an own code table of the chroma part itself.

4. The entropy coding method for coding video prediction residual coefficients as claimed in claim 1, wherein the step 3 further comprises:
    step 31: coding a last (level, run) pair by using a default code table;
    step 32: selecting a code table for coding a (level, run) pair positioned before the just coded (level, run) pair according to a level value of the just coded (level, run) pair;
    step 33: coding the (level, run) pair positioned before the just coded (level, run) pair using the code table selected by step 32;
    step 34: proceeding to step 32 if not completely coding all (level, run) pairs; else ending step 3.

5. The entropy coding method for coding video prediction residual coefficients as claimed in claim 4, wherein the default code table in step 31 is a VLC0_inter code table when coding the Inter type image block; and the default code table is a VLC0_intra code table when coding the Intra type image block.

6. The entropy coding method for coding video prediction residual coefficients as claimed in claim 4, wherein said converting into an Exp-Golomb code comprises the detailed procedures of: at first deciding a rank of the Exp-Golomb code needed for converting according to the code table, then looking up the corresponding Exp-Golomb code from an Exp-Golomb code table according to the rank and the code word, and completing the conversion.

7. The entropy coding method for coding video prediction residual coefficients as claimed in claim 5, wherein deciding a rank of the Exp-Golomb code to be converted comprises the detailed procedures of:
    step 100: determining a type of the conversion if the codeword is coming from the (level, run) or EOB covered in the code table, then proceeding to step 101; if the level value or run value not covered in the code table, then proceeding to step 102;
    step 101: deciding the rank of the Exp_Golomb code according to different code tables;

step 102: deciding the rank of the Exp_Golomb code according to the type of the macro block where the image block exists, which is an Intra type or an Inter type.

8. The entropy coding method for coding video prediction residual coefficients as claimed in claim 1, wherein the step 4 comprises the detailed procedures of: selecting a code table for coding the EOB according to the level value of the last coded (level, run) pair in step 3, looking up a corresponding EOB code word from the code table and converting it into an Exp_Golomb code.

* * * * *